US011878385B2

(12) United States Patent
Kanbayashi

(10) Patent No.: US 11,878,385 B2
(45) Date of Patent: Jan. 23, 2024

(54) METHOD FOR SLICING INGOT

(71) Applicant: SHIN-ETSU HANDOTAI CO., LTD., Tokyo (JP)

(72) Inventor: Keiichi Kanbayashi, Nishigo-mura (JP)

(73) Assignee: SHIN-ETSU HANDOTAI CO., LTD., Tokyo (JP)

( * ) Notice: Subject to any disclaimer, the term of this patent is extended or adjusted under 35 U.S.C. 154(b) by 1177 days.

(21) Appl. No.: 16/490,737

(22) PCT Filed: Mar. 2, 2018

(86) PCT No.: PCT/JP2018/007998
§ 371 (c)(1),
(2) Date: Sep. 3, 2019

(87) PCT Pub. No.: WO2018/173693
PCT Pub. Date: Sep. 27, 2018

(65) Prior Publication Data

US 2020/0016719 A1 Jan. 16, 2020

(30) Foreign Application Priority Data

Mar. 21, 2017 (JP) ................................ 2017-054830

(51) Int. Cl.
*B24B 27/06* (2006.01)
*B28D 5/04* (2006.01)
(Continued)

(52) U.S. Cl.
CPC .......... *B24B 27/0633* (2013.01); *B24B 55/02* (2013.01); *B28D 5/04* (2013.01); *B24B 41/02* (2013.01)

(58) Field of Classification Search
CPC ...... B28D 5/045; B28D 1/08; B24B 27/0633; B23D 61/185; B23D 57/0053; B23D 57/0023; B23D 57/0007
See application file for complete search history.

(56) References Cited

U.S. PATENT DOCUMENTS

| | | | |
|---|---|---|---|
| 6,283,111 | B1 | 9/2001 | Onizaki et al. |
| 2009/0288530 | A1 | 11/2009 | Oishi et al. |

(Continued)

FOREIGN PATENT DOCUMENTS

| | | |
|---|---|---|
| JP | 2001-001248 A | 1/2001 |
| JP | 2003-145406 A | 5/2003 |

(Continued)

OTHER PUBLICATIONS

Jan. 26, 2022 Office Action issued in Korean Patent Application No. 10-2019-7027705.

(Continued)

*Primary Examiner* — Joel D Crandall
(74) *Attorney, Agent, or Firm* — Oliff PLC

(57) ABSTRACT

A method for slicing an ingot with a wire saw, comprising: forming a wire row by a wire spirally wound between a plurality of wire guides and configured to travel in an axial direction of the wire; feeding an ingot held with a workpiece-feeding mechanism to the wire row for slicing; and slicing the ingot into a plurality of wafers, while supplying a slurry to a contact portion between the ingot and the wire, wherein a warp direction in a wire travelling direction of a wafer obtained in previous ingot slicing is checked in advance, and the ingot is then sliced under a condition that a warp direction in a workpiece feeding direction of a wafer to be obtained matches the checked warp direction in the wire travelling direction, so that the wafers have identical warp directions in the workpiece feeding direction and in the wire travelling direction.

6 Claims, 18 Drawing Sheets

(51) Int. Cl.
*B24B 55/02* (2006.01)
*B24B 41/02* (2006.01)

(56) References Cited

U.S. PATENT DOCUMENTS

| | | | |
|---|---|---|---|
| 2010/0089377 | A1 | 4/2010 | Oishi et al. |
| 2015/0371909 | A1 | 12/2015 | Bhagavat et al. |

FOREIGN PATENT DOCUMENTS

| | | | | | |
|---|---|---|---|---|---|
| JP | 2004-114280 | A | | 4/2004 | |
| JP | 2005-103683 | A | | 4/2005 | |
| JP | 2008-078474 | A | | 4/2008 | |
| JP | 2008-213110 | A | | 9/2008 | |
| JP | 2015-156433 | A | | 8/2015 | |
| JP | 2016-505214 | A | | 2/2016 | |
| KR | 20090057029 | A | * | 6/2009 | ........... Y10T 117/10 |
| WO | 2015/125366 | A1 | | 8/2015 | |

OTHER PUBLICATIONS

May 28, 2018 International Search Report issued in International Application No. PCT/JP2018/007998.

* cited by examiner

METHOD FOR SLICING INGOT

TECHNICAL FIELD

The present invention relates to a method for slicing an ingot.

BACKGROUND ART

In recent years, larger wafers have been demanded, and a wire saw is mainly used to slice an ingot to cope with this increase in size. A wire saw is an apparatus that causes a wire (high tensile steel wire) to travel at a high speed, to which a workpiece (examples thereof include ingots of brittle materials such as silicon, glass, and ceramics.) is pressed and sliced while applying a slurry thereto, thereby cutting out many wafers at the same time (see, for example, Patent Document 1).

CITATION LIST

Patent Literature

Patent Document 1: Japanese Unexamined Patent Application publication (Kokai) No. 2004-114280

Patent Document 2: Japanese Unexamined Patent. Application publication (Kohyou) No. 2016-505214

SUMMARY OF INVENTION

Technical Problem

A wafer obtained by slicing an ingot with a wire saw as described above is normally subjected to grinding and polishing processes. When the wafer is subjected to an epitaxy process, the wafer is warped into a form of convex shape. To control such warp after an epitaxial process, there is a technique as in Patent Document 2, for example. However, after an epitaxial process is performed, a wave is generated on the plane of the wafer. Hence, the epitaxial wafer has a problem of having a non-uniform shape.

The present invention has been made in view of the problem as described above. An object of the present invention is to provide a method for slicing an ingot, enabling wafers to have few waves generated on planes thereof after an epitaxial process is performed.

Solution to Problem

To achieve the object, the present invention provides a method for slicing an ingot with a wire saw, comprising:

forming a wire row by a wire spirally wound between a plurality of wire guides and configured to travel in an axial direction of the wire;

feeding an ingot held with a workpiece-feeding mechanism to the wire row for slicing; and slicing the ingot into a plurality of wafers, while supplying a slurry to a contact portion between the ingot and the wire, wherein a warp direction in a wire travelling direction of a wafer obtained in previous ingot slicing is checked in advance, and the ingot is then sliced under a condition that a warp direction in a workpiece feeding direction of a wafer to be obtained matches the checked warp direction in the wire travelling direction, so that the wafers have identical warp directions in the workpiece feeding direction and in the wire travelling direction.

As described above, the warp direction in the wire travelling direction of a wafer specific to the wire saw is checked in advance, and the warp direction in the workpiece feeding direction is controlled so as to match with the checked warp direction in the wire travelling direction; thereby, the warp directions in the workpiece feeding direction are identical to those in the wire travelling direction. Thus, it is possible to obtain wafers with few waves after an epitaxial process is performed.

In this event, in order that the warp direction in the workpiece feeding direction matches with the warp direction in the wire travelling direction, it is preferable to cause a temperature adjusting function of the wire saw to control one or more of a temperature of cooling water flowing inside a wire saw casing which holds the workpiece-feeding mechanism, a temperature of cooling water flowing inside each of the plurality of wire guides, and a temperature of the slurry, and the warp directions and warp absolute amounts in the workpiece feeding direction of the plurality of wafers cut out from the ingot are thus controlled.

In this manner, controlling the warp directions and the warp absolute amounts in the workpiece feeding direction of the cut out wafers makes it possible to satisfy the condition that the warp direction in the workpiece feeding direction matches the warp direction in the wire travelling direction, and also to control the warp amount in slicing the ingot.

Moreover, in this event, the warp directions and the warp absolute amounts in the workpiece feeding direction of the plurality of wafers cut out from the ingot are preferably controlled, so that the warp directions in the workpiece feeding direction of all the wafers cut out from the ingot are identical regardless of positions in the ingot.

Often, the warp directions in the wire travelling direction are the same regardless of the positions in an ingot. Accordingly, the warp directions in the workpiece feeding direction are preferably identical regardless of the positions in the ingot to make all the cut wafers have identical warp directions in the workpiece feeding direction and in the wire travelling direction.

Further, in order that the warp directions in the workpiece feeding direction of all the wafers cut out from the ingot are identical regardless of the positions in the ingot, it is preferable to control each temperature of the temperature of the cooling water flowing inside the wire saw casing, the temperature of the cooling water flowing inside each of the plurality of wire guides, and the temperature of the slurry such that a temperature difference between the each temperature when slicing the ingot is started and ended and the each temperature when a central portion of the ingot is sliced is larger by 4% than the each temperature when slicing the ingot is started and ended.

In a case where a temperature difference of each of the aforementioned temperatures between when slicing the ingot is started and when the central portion is sliced is larger by 4% than the temperature when the slicing is started and a temperature difference between when slicing the ingot is ended and when the central portion is sliced is larger by 4% than the temperature when the slicing is ended, orientations of the warps in the workpiece feeding direction of all the wafers can be the same regardless of the positions in the ingot.

In this event, the temperature of the cooling water flowing inside the wire saw casing can be controlled such that the temperature when the central portion of the ingot is sliced is higher by 4% than the temperature when slicing the ingot is started and ended, and the temperature of the cooling water flowing inside the wire guides and the temperature of the slurry can be controlled such that the temperatures when the central portion of the ingot is sliced are respectively lower by 4% than the temperatures when slicing the ingot is started and ended, so that the warps in the workpiece feeding direction of all the wafers cut out from the ingot are convex shaped.

Meanwhile, the temperature of the cooling water flowing inside the wire saw casing can be controlled such that the temperature when the central portion of the ingot is sliced is lower by 4% than the temperature when slicing the ingot is started and ended, and the temperature of the cooling water flowing inside the wire guides and the temperature of the slurry can be controlled such that the temperatures when the central portion of the ingot is sliced are respectively higher by 4% than the temperatures when slicing the ingot is started and ended, so that the warps in the workpiece feeding direction of all the wafers cut out from the ingot are concave shaped.

By these controls as above, the warps in the workpiece feeding direction of all the wafers cut out from the ingot can be uniform and directed in one desired direction.

Advantageous Effects of Invention

The inventive method for slicing an ingot makes it possible to obtain wafers having identical warp directions in the wire travelling direction and in the workpiece feeding direction, and consequently wafers with few waves generated after an epitaxial process is performed.

DESCRIPTION OF EMBODIMENTS

Hereinafter, embodiments of the present invention will be described. However, the present invention is not limited thereto.

As described above, when wafers cut out from an ingot by using a wire saw is subjected to an epitaxial process as a subsequent step, waves are generated on planes of the wafers, resulting in a problem that the epitaxial wafers have non-uniform shapes. Against this, the present inventor has earnestly studied, obtained the following findings, and completed the present invention.

When wafers obtained by slicing an ingot with a wire saw are observed to check warp forms in a workpiece feeding direction, there are a wafer having a convex shape and a wafer having a concave shape, depending on positions in the ingot.

Further, when warp forms in a wire travelling direction of the wafers obtained by slicing the ingot with the wire saw are checked, there are a wafer whose warp form coincides with that in the workpiece feeding direction and a wafer whose warp form does not coincide. The present inventor has found that if the warp directions differ between the workpiece feeding direction and the wire travelling direction as described above, a wave is generated on the plane of the wafer after an epitaxial process is performed, so that the epitaxial wafer has a non-uniform shape.

Meanwhile, the direction of the warp form in the wire travelling direction is basically specific to each wire saw apparatus and the same regardless of the positions in an ingot. Further, it is difficult to control, that is, change by adjustment, the warp form in the wire travelling direction. Hence, the present inventor has arrived at controlling the warp form in the workpiece feeding direction, which is relatively easily controlled in comparison with the control of the warp form in the wire travelling direction, so that the warp directions in the workpiece feeding direction and the wire travelling direction coincide with each other. Thus, the inventor has completed the present invention. A method for slicing an ingot according to the present invention will be described below.

Figure 1:
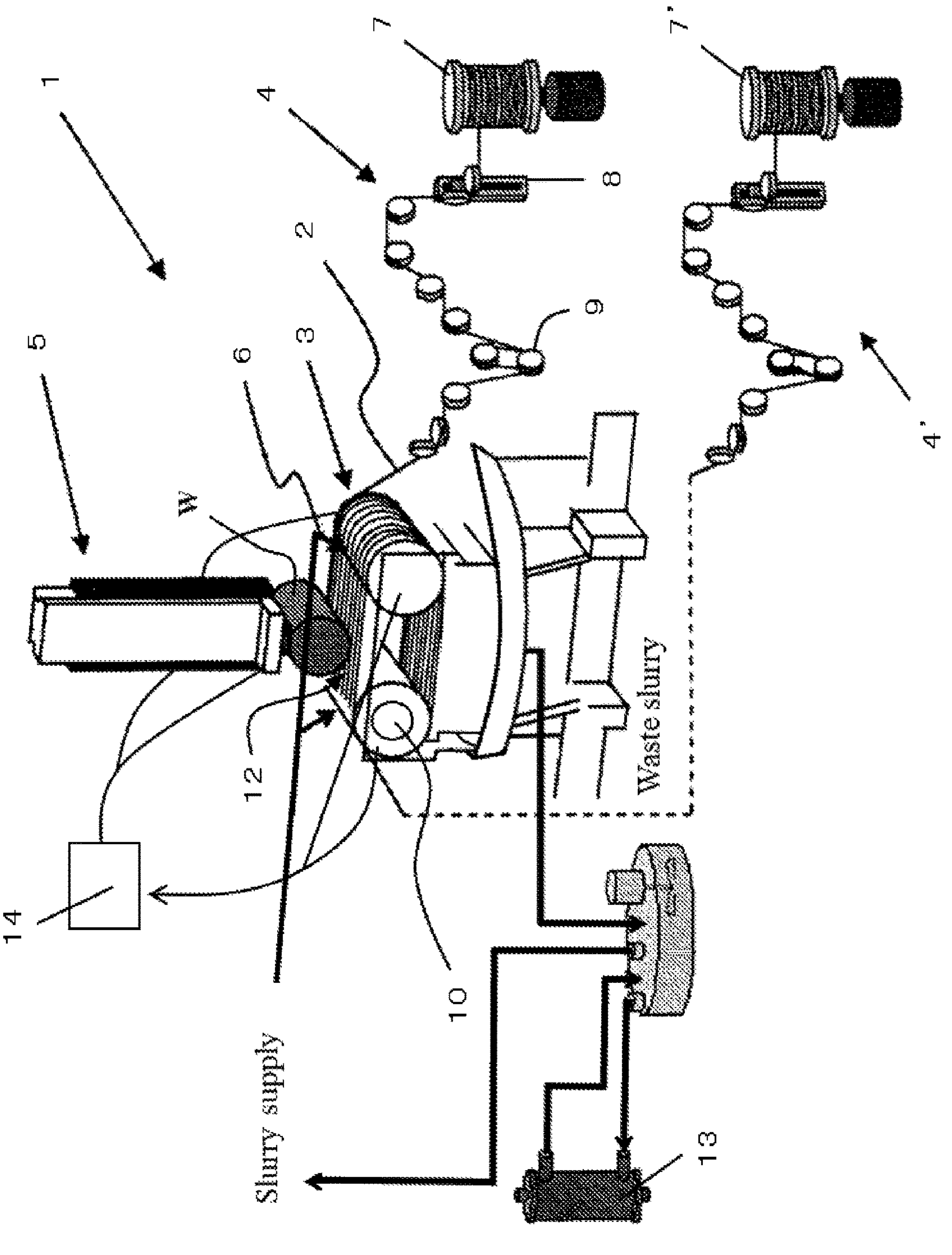
FIG. 1 is a schematic view showing an example of a wire saw usable in the present invention.

First, an overview of an example of a wire saw usable in the present invention will be described with reference to FIGS. 1, 2. As shown in FIG. 1, a wire saw 1 mainly includes: a wire 2 for slicing an ingot W; a plurality of wire guides 3 between which the wire 2 is spirally wound; a tension applying mechanism 4 for applying a tensile force to the wire 2; a workpiece-feeding mechanism 5 for feeding the ingot W to be sliced; a nozzle 6 for supplying, during the slicing, a slurry, in which abrasive grains are dispersed and mixed in a coolant; and the like. The wire 2 is wound between the plurality of wire guides 3 to form a wire row 12. When an ingot is sliced, the wire 2 travels in an axial direction of the wire 2. The ingot W held with the workpiece-feeding mechanism 5 is fed to the wire row 12 for slicing. At the same time, the ingot W is sliced into a plurality of wafers, while a slurry is supplied to a contact portion between the ingot W and the wire 2.

The wire 2 is reeled out from one wire reel 7, and reaches the plurality of wire guides 3 through a traverser 8 and the tension applying mechanism 4 constituted of a powder clutch (constant torque motor 9), a dancer roller (dead weight) (not shown), and so forth. After wound around these plurality of wire guides 3 approximately 300 to 400 times, the wire 2 passes through another tension applying mechanism 4' and is wound around a wire reel 7'.

Moreover, the plurality of wire guides 3 may be rollers each obtained by press fitting a polyurethane resin around a steel cylinder and forming grooves on a surface thereof at a fixed pitch. The wound wire 2 can be driven in a reciprocating direction at a predetermined cycle by a drive motor 10.

Further, the nozzle 6 is provided near the plurality of wire guides 3 and the wire 2 wound therearound. The nozzle 6 is capable of spraying a slurry to the wire guides 3 and the wire 2 during the slicing, thereby supplying the slurry to the contact portion between the ingot W and the wire 2. Note that the slurry used for the slicing is discharged as waste slurry.

A temperature adjusting function 13 such as a heat exchanger is provided in the wire saw and adjusts the temperature of the slurry to be supplied to a target temperature in accordance with ingot slicing positions (cutting positions) set in advance. The slurry can be supplied at the controlled temperature.

Additionally, cooling water flows inside a shaft of each of the wire guides 3. Like the slurry to be supplied, the temperature of the cooling water is adjusted by a temperature adjusting function 14 such as a heat exchanger provided in the wire saw, and controlled to a temperature in accordance with the ingot slicing positions set in advance.

Figure 2:
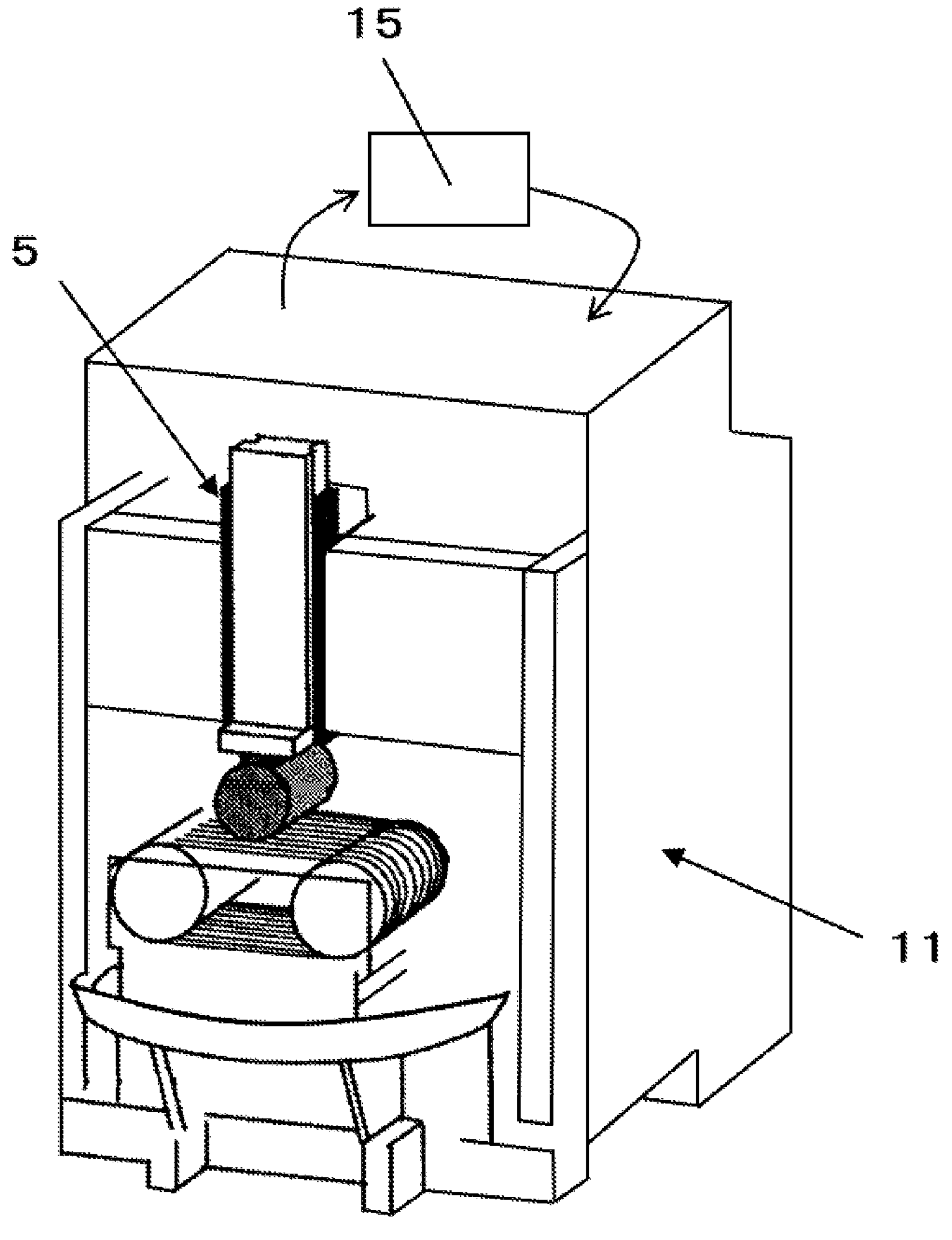
FIG. 2 is a schematic view showing an example of a wire saw casing configured to hold a workpiece-feeding mechanism in the wire saw usable in the present invention.

Further, cooling water flows also inside a wire saw casing 11 which holds the workpiece-feeding mechanism 5 having VM guides as shown in FIG. 2. Like the cooling water inside the shafts of the wire guides, and so forth, the temperature of the cooling water is adjusted by a temperature adjusting function 15 such as a heat exchanger provided in the wire saw, and controlled to a temperature in accordance with the ingot slicing positions set in advance.

When the wire saw 1 as described above is used, an appropriate tensile force is applied to the wire 2 by using the wire tension applying mechanism 4, the drive motor 10 causes the wire 2 to travel in the reciprocating direction, and the ingot W is sliced while a slurry is being supplied. Thus, a plurality of wafers are obtained.

The inventive method for slicing an ingot will be described below based on an example of using such a wire saw.

In the present invention, before slicing an ingot is started, a warp direction in the wire travelling direction of a wafer obtained in previous ingot slicing (previous lot) is checked in advance. It should be noted that the direction of a warp form in the wire travelling direction is basically intrinsic to each wire saw, and does not vary among slicing batches. For this reason, this checking does not have to be performed every time.

Note that the warp direction of a wafer can be judged based on its BOW value. The warp direction can be judged such that when the BOW value of a wafer is positive, the warp is convex shaped; when the BOW value is negative, the warp is concave shaped.

Next, when a subsequent ingot is sliced (subsequent lot), this ingot W is sliced by controlling a slicing condition such that a warp direction in the workpiece feeding direction of a wafer to be obtained coincides with the warp direction in the wire travelling direction in the previous lot.

In slicing an ingot with the wire saw, the warp form in the workpiece feeding direction can be controlled without particular limitation. Nevertheless, one or more of the temperature of the cooling water flowing inside the wire saw casing, the temperature of the cooling water flowing inside each of the wire guides, and the temperature of the slurry supplied when the ingot is sliced may be controlled by the temperature adjusting functions 13, 14, 15 of the wire saw.

Controlling one or more of these temperatures makes it possible to control the warp directions and warp absolute amounts in the workpiece feeding direction of the plurality of wafers cut out from the ingot. Thus, the warp directions and absolute amounts in the workpiece feeding direction in the subsequent lot can be adjusted based on the warp in the wire travelling direction checked from the wafer produced in the previous lot.

Further, in the present invention, the warp directions and the warp absolute amounts in the workpiece feeding direction of the plurality of wafers cut out from the ingot are preferably controlled, so that the warp directions in the workpiece feeding direction of ail the wafers cut out from the ingot are identical regardless of the positions in the ingot. As described above, the warp directions in the wire travelling direction of wafers are basically the same regardless of the positions in the ingot in many cases. Therefore, when the warp directions in the workpiece feeding direction of all the wafers are identical, all the wafers can have identical warp directions in the workpiece feeding direction and in the wire travelling direction.

Meanwhile, when the warp directions in the workpiece feeding direction of wafers are different from place to place in the ingot, after the shape of a sliced wafer is checked, a wafer(s) at a certain position(s) may be reversed, so that the directions of the warp forms in the workpiece feeding direction can be the same irrespective of the positions in the ingot. Further, the warp directions and so on can also be adjusted by performing a double-disc grinding step on wafers sliced with the wire saw. Nevertheless, when the warp directions in the workpiece feeding direction of all the wafers are identical as described above, it is not necessary to add the reversing step and the double-disc grinding step which is inferior to a lapping step in the productivity. Thus, after slicing is performed with the wire saw, if the warp directions in the workpiece feeding direction are the same regardless of the positions in the ingot, the reversing step and the double-disc grinding step can be omitted, so that the productivity in producing wafers can be further enhanced.

In order that the warp directions in the workpiece feeding direction of all the wafers cut out from the ingot W are made identical regardless of the positions in the ingot, it is only necessary to control each temperature of the temperature of the cooling water flowing inside the wire saw casing 11, the temperature of the cooling water flowing inside the plurality of wire guides 3, and the temperature of the slurry such that a temperature difference between the each temperature when slicing the ingot W is started and ended and the each temperature when a central portion of the ingot W is sliced is larger by 4% than the each temperature when slicing the ingot W is started and ended. In this case, it is enough to control the each temperature of the temperature of the cooling water flowing inside the wire saw casing 11, the temperature of the cooling water flowing inside the plurality of wire guides 3, and the temperature of the slurry such that the temperature difference between the each temperature when slicing the ingot W is started and ended and the each temperature when the central portion of the ingot W is sliced are larger by 10% than the each temperature when slicing the ingot W is started and ended.

Figure 3A:
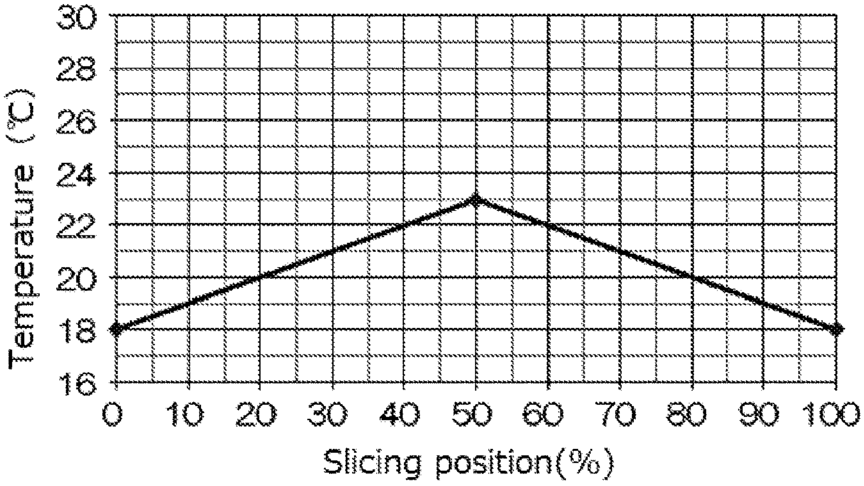
FIG. 3 shows graphs for illustrating an example of temperature conditions under which warp forms in a workpiece feeding direction of all wafers cut out from an ingot are convex shaped.
Figure 3B:
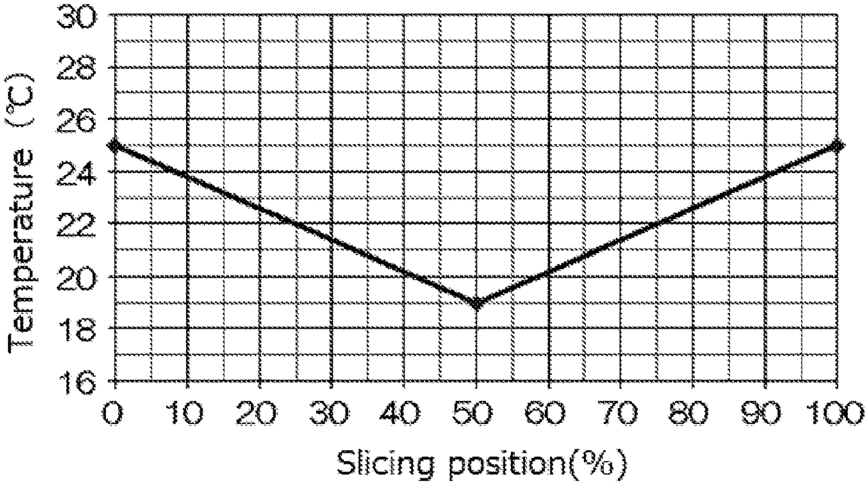
Figure 3C:
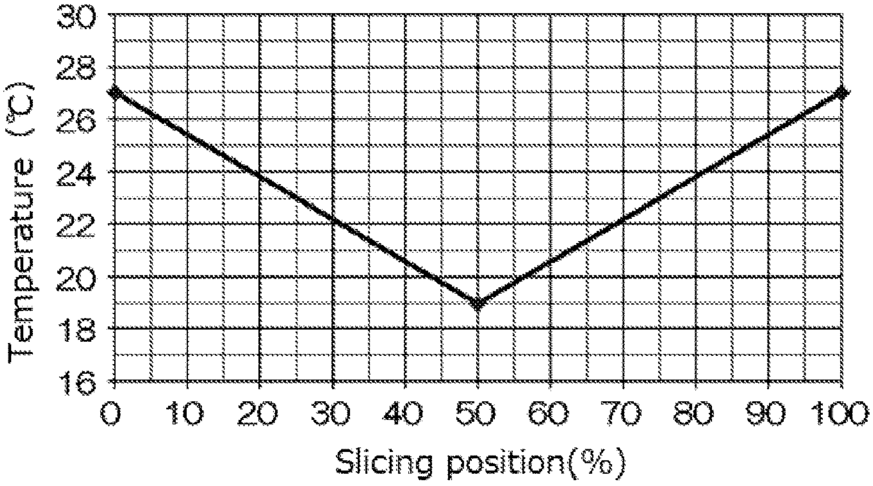

More specifically, when the warp forms in the workpiece feeding direction of all the wafers are desirably convex shaped (the BOW values are positive), it is only necessary to control the temperature of the cooling water flowing inside the wire saw casing 11, the temperature of the cooling water flowing inside the wire guides 3, and the temperature of the slurry supplied when the ingot is sliced to temperatures as shown in graphs of FIG. 3. In FIG. 3, (a) is a graph showing the temperature (° C.) of the cooling water flowing inside the wire saw casing 11 in relation to the slicing position (%); (b) is a graph showing the temperature (° C.) of the cooling water flowing inside the wire guides in relation to the slicing position (%); and (c) is a graph showing the temperature (° C.) of the slurry in relation to the slicing position (%). In the graphs of FIG. 3, values of the slicing position close to 0% mean when the slicing is started, those close to 50% mean when the central portion is sliced, and those close to 100% mean when the slicing is ended. The same applies to the subsequent graphs related to the temperature.

Regarding the temperature of the cooling water flowing inside the wire saw casing 11, the temperature when the slicing is started and ended is lowered in comparison with that when the central portion of the ingot is sliced as shown in FIG. 3(*a*). In addition, regarding the temperature of the cooling water flowing inside the wire guides 3 and the temperature of the slurry supplied when the ingot is sliced, the temperatures when the slicing is started and ended are raised in comparison with that when the central portion of the ingot is sliced as shown in FIG. 3(*b*), (*c*). Controlling by using the temperature adjusting functions 13, 14, 15 to achieve such temperature differences enables all the wafers to have convex-shaped warp forms in the workpiece feeding direction. In this event, when the temperature differences are larger by 4% than the temperatures when the slicing is started and ended, all the wafers can more surely have convex-shaped warp forms in the workpiece feeding direction.

Figure 4A:
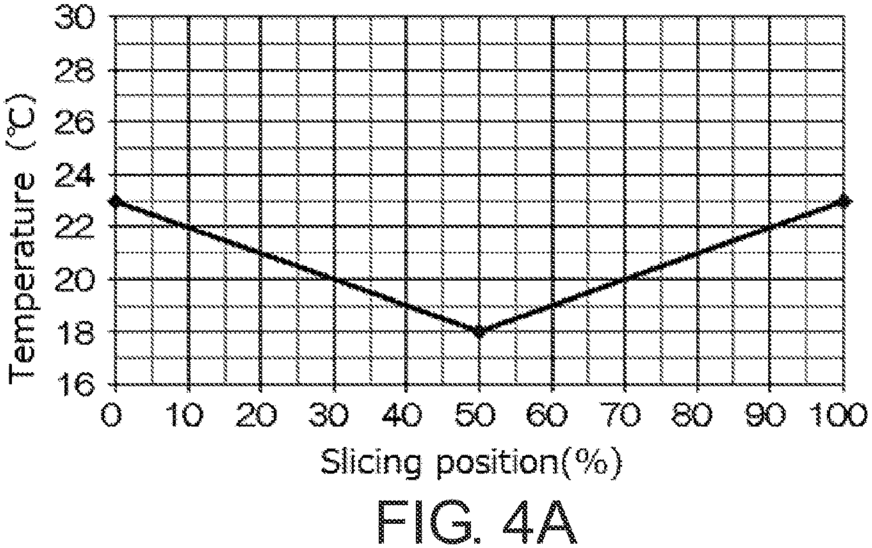
FIG. 4 shows graphs for illustrating an example of temperature conditions under which warp forms in the workpiece feeding direction of all wafers cut out from an ingot are concave shaped.
Figure 4B:
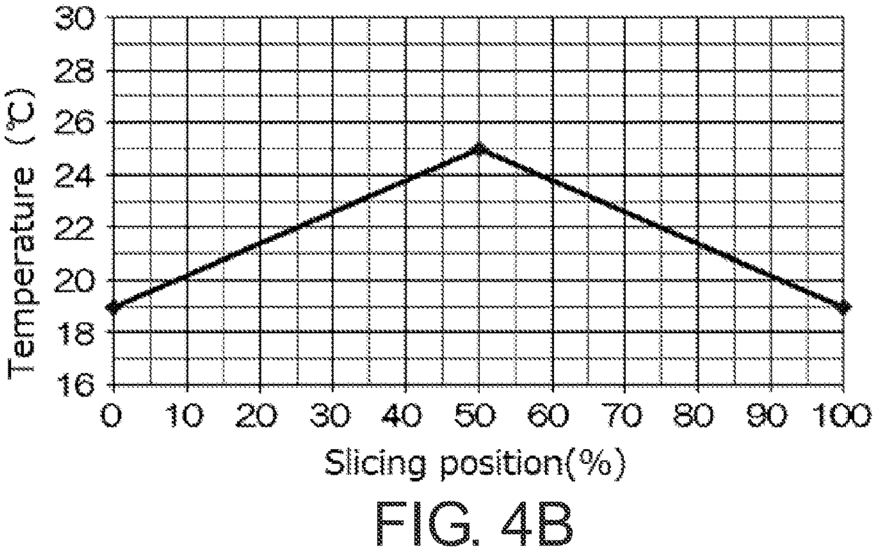
Figure 4C:

On the other hand, when the warp forms in the workpiece feeding direction of all the wafers are desirably concave shaped (the BOW values are negative), it is only necessary to control the aforementioned temperatures to temperatures as shown in graphs of FIG. 4. Regarding the temperature of the cooling water flowing inside the wire saw casing 11, the temperature when the slicing is started and ended is raised in comparison with that when the central portion of the ingot is sliced as shown in FIG. 4(*a*). In addition, regarding the temperature of the cooling water flowing inside the wire guides 3 and the temperature of the slurry supplied when the ingot is sliced, the temperatures when the slicing is started and ended are lowered in comparison with that when the central portion of the ingot is sliced as shown in FIGS. 4 (*b*), (*c*). Controlling by using the temperature adjusting functions 13, 14, 15 to achieve such temperature differences enables all the wafers to have concave-shaped warp forms in the workpiece feeding direction. In this event also, when the temperature differences are larger by 4% than the temperature when the slicing is started and ended, all the wafers can more surely have concave-shaped warp forms in the workpiece feeding direction.

As described above, the absolute amounts of the warps in the workpiece feeding direction of the wafers can be adjusted based on the temperature differences in the aforementioned three temperatures between when the ingot central portion is sliced and when the slicing is started and ended. When the warp absolute amounts are desirably large, the temperature differences between when the central portion is sliced and when the slicing is started and ended should be increased. When the warp absolute amounts are desirably small, the temperature difference of each temperature between when the central portion is sliced and when the slicing is started and ended should be decreased. Nevertheless, if the temperature differences are too small, the warp forms in the workpiece feeding direction in the ingot are not easily directed in the same direction. Accordingly, it is desirable to make the temperature differences with certain ranges.

The inventive method for slicing an ingot as described above makes it possible to obtain wafers having identical warp directions in the wire travelling direction and in the workpiece feeding direction, consequently wafers with few waves generated after an epitaxial process is performed.

EXAMPLES

Hereinafter, the present invention will be more specifically described by showing Examples and Comparative Examples of the present invention. However, the present invention is not limited to these Examples.

In Examples and Comparative Examples, as the ingot, silicon ingots were sliced, but will be simply described as ingot hereinbelow.

Comparative Example 1

Figure 5A:
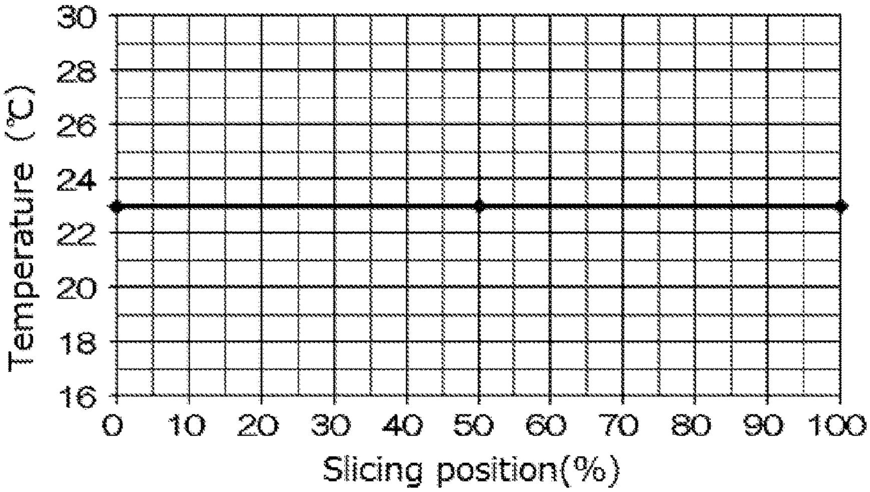
FIG. 5 shows graphs for illustrating temperature conditions in Comparative Example 1.
Figure 5B:
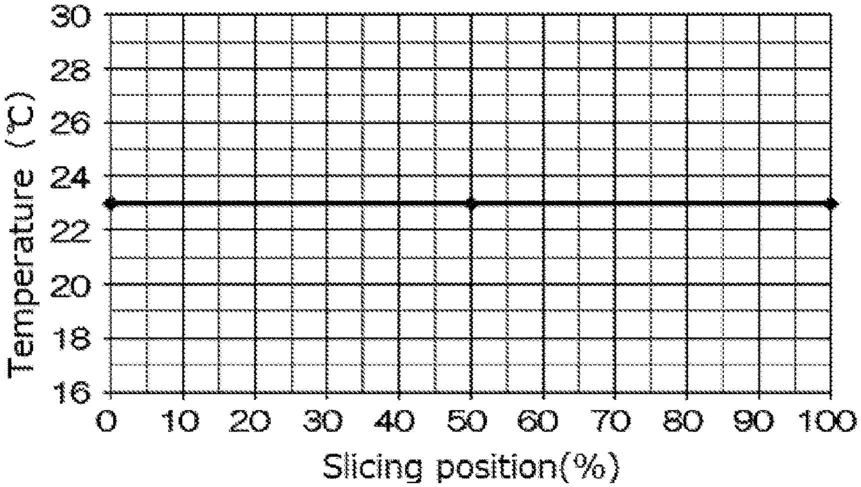
Figure 5C:
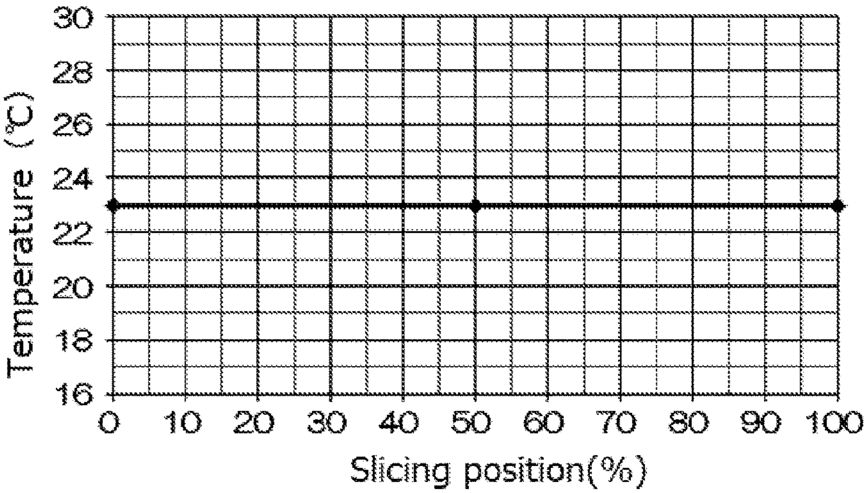

In Comparative Example 1, an ingot was sliced using a wire saw (apparatus A). Nevertheless, the ingot was sliced without checking the warp direction in the wire travelling direction of a wafer obtained in previous ingot slicing and without controlling the warp direction in the workpiece feeding direction based on the warp direction in the wire travelling direction. In this Comparative Example 1, the ingot was sliced while the temperature of the cooling water flowing inside the wire saw casing, the temperature of the cooling water flowing inside the wire guides, and the temperature of the slurry supplied when the ingot was sliced were set at a constant temperature as shown in FIG. 5 regardless of the ingot slicing positions.

Figure 6:
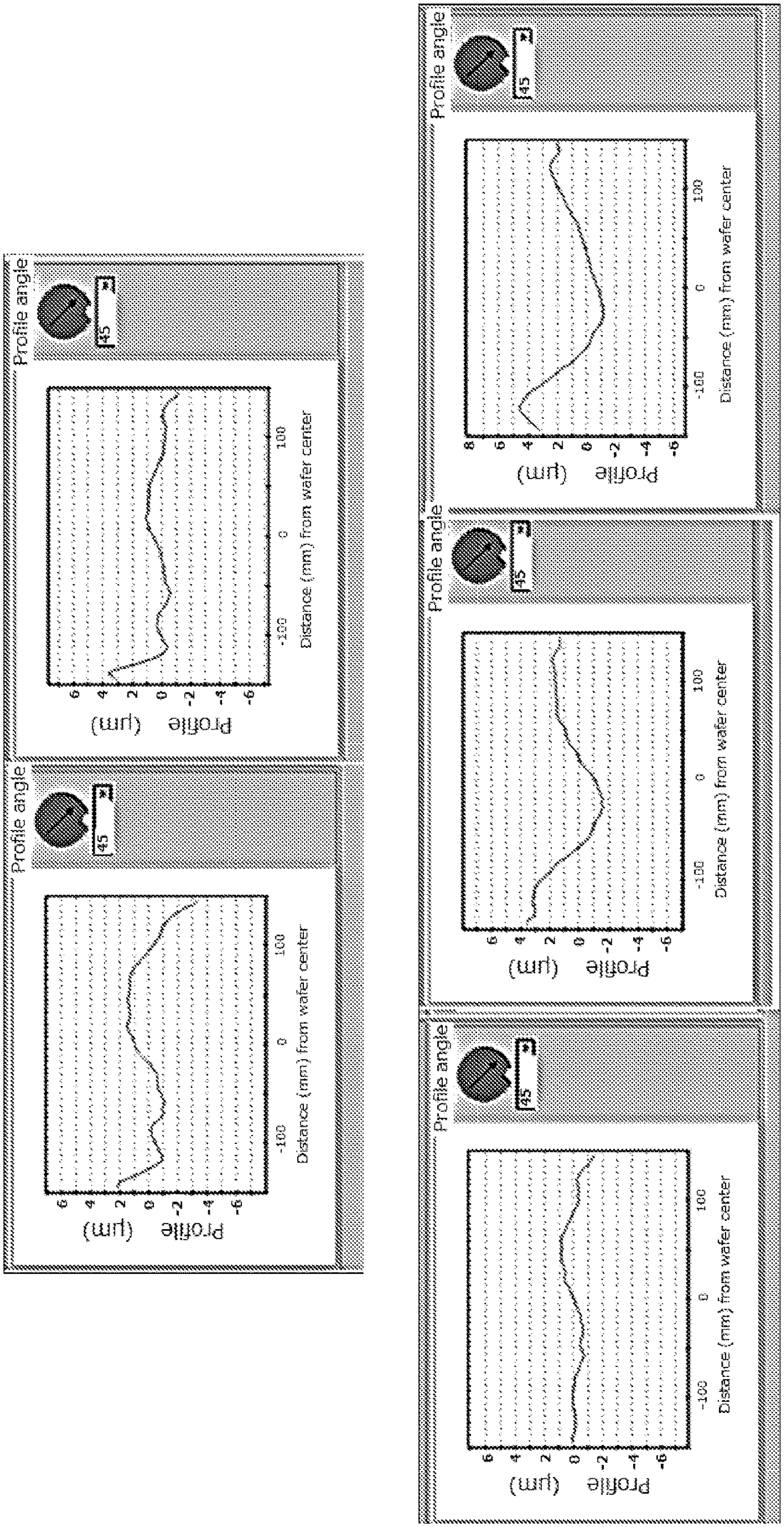
FIG. 6 shows graphs for illustrating warp forms in a workpiece feeding direction of sliced wafers in Comparative Example 1.

Then, the warp forms in the workpiece feeding direction of the sliced wafers were observed. FIG. 6 shows the result. Note that although FIG. 6 shows several graphs, the graphs on the left side show the warps of wafers cut out from positions closer to a P side (top side) of the ingot, and the graphs on the right side show the warps of wafers cut out from positions closer to a K side (tail side) of the ingot. The same applies to the subsequent graphs related to warps. As shown in FIG. 6, the warps in the workpiece feeding direction were such that the BOW values were above and below 0, depending on the ingot slicing positions. Some wafers (positioned closer to the P side) were convex shaped, and the other wafers (positioned closer to the K side) were concave shaped. The warp directions in the wire travelling direction of some of the wafers were opposite of those in the workpiece feeding direction because the observation result of Example 1, which will be described, showed on the other hand that the warps in the wire travelling direction were convex shaped at any position in an ingot, with this wire saw (apparatus A).

Example 1

Figure 7:
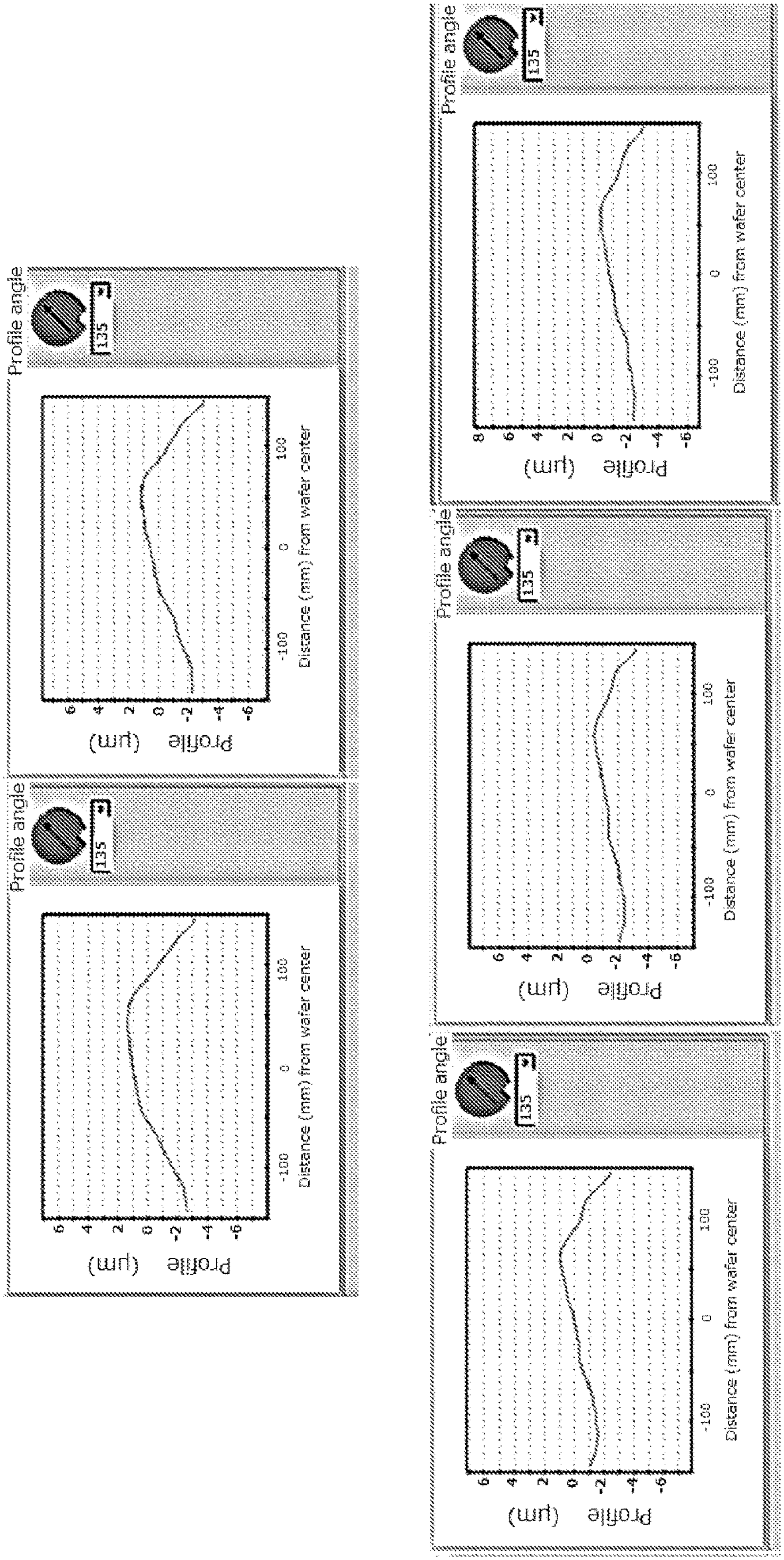
FIG. 7 shows graphs for illustrating warp forms in a wire travelling direction of wafers which have been checked in advance in a wire saw (apparatus A) before slicing in Example 1.

An ingot was sliced using the same wire saw (apparatus A) as in Comparative Example 1. Nevertheless, first of all, the warp directions in the wire travelling direction of wafers obtained in previous ingot slicing were checked in advance before the slicing. With this wire saw (apparatus A), a convex shape was observed at any position in the ingot as shown in FIG. 7.

Next, the slicing was performed such that the directions of the warp forms in the workpiece feeding direction and in the wire travelling direction of wafers cut out from a subsequent ingot were all convex shaped. Specifically, the ingot was sliced by controlling the temperature of the cooling water flowing inside the wire saw casing, the temperature of the cooling water flowing inside the wire guides, and the temperature of the slurry supplied when the ingot was sliced as shown in FIG. 3.

Figure 8:
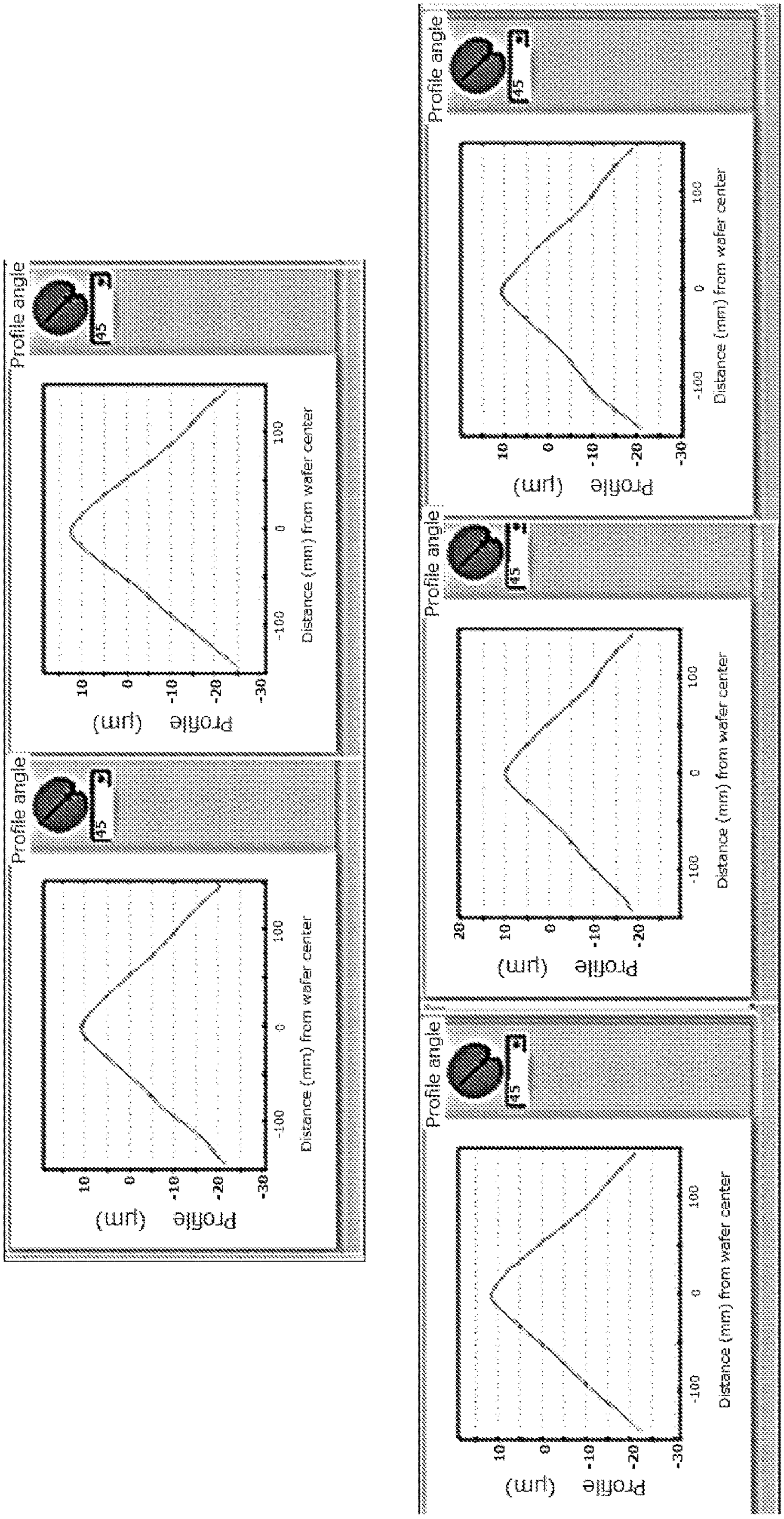
FIG. 8 shows graphs for illustrating warp forms in the workpiece feeding direction of sliced wafers in Example 1.
Figure 9:
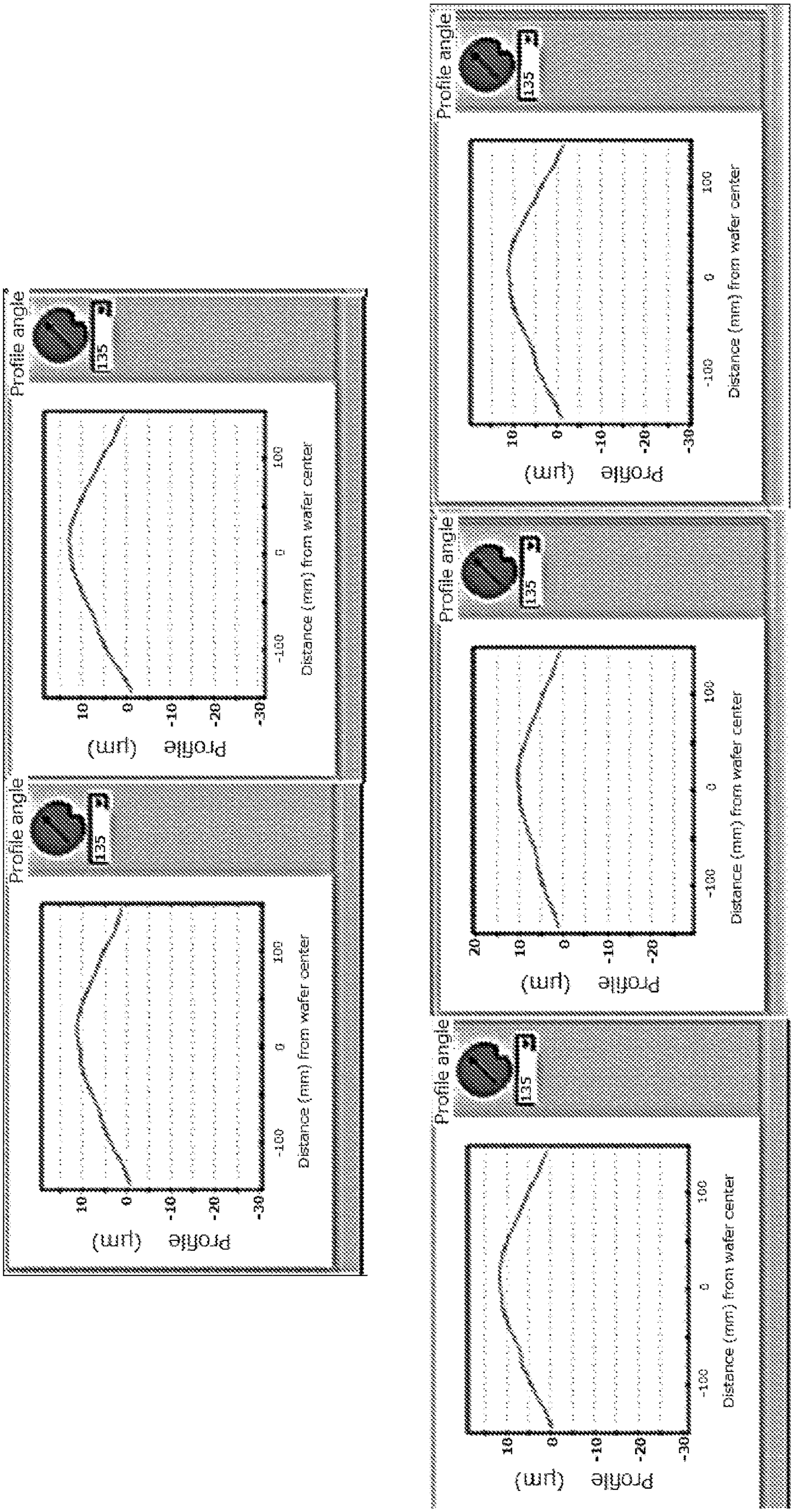
FIG. 9 shows graphs for illustrating warp forms in the wire travelling direction of the sliced wafers in Example 1.

The forms of the sliced wafers were observed. The warp forms in the workpiece feeding direction were as shown in FIG. 8. Regardless of the ingot slicing positions, all the wafers had positive BOW values, and were all convex shaped. Moreover, the warp forms in the wire travelling direction were as shown in FIG. 9. Like the warps in the wire travelling direction checked in advance, regardless of the ingot slicing positions, all the wafers had positive BOW values, and were all convex shaped. As described above, the obtained wafers were such that the directions of the warp forms in the workpiece feeding direction and in the wire travelling direction were identical regardless of the positions in the ingot.

Example 2

Figure 10A:
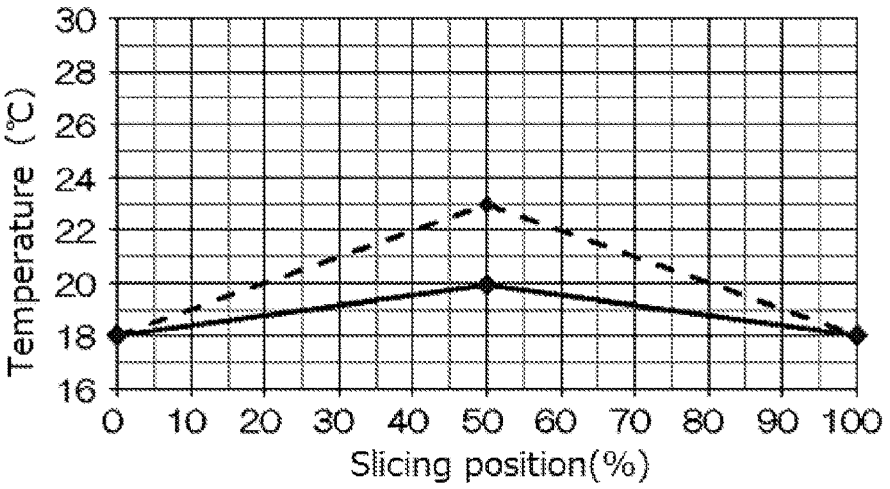
FIG. 10 shows graphs for illustrating temperature conditions in Example 2.
Figure 10B:
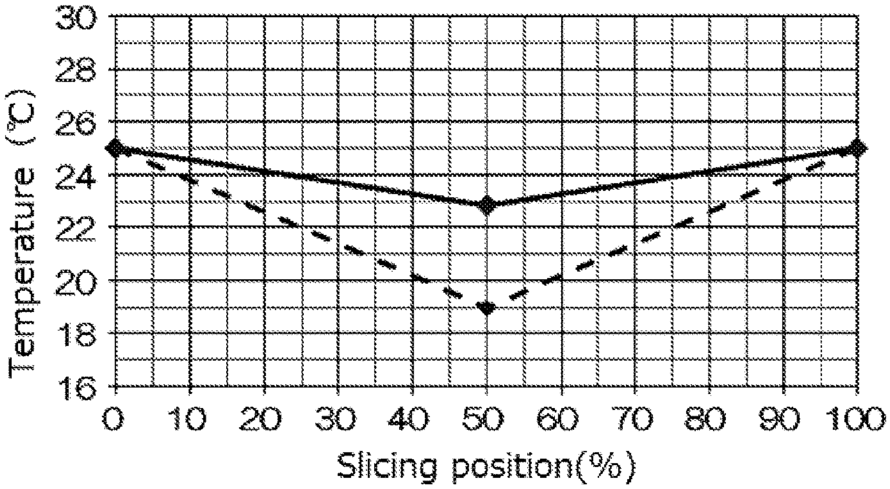
Figure 10C:
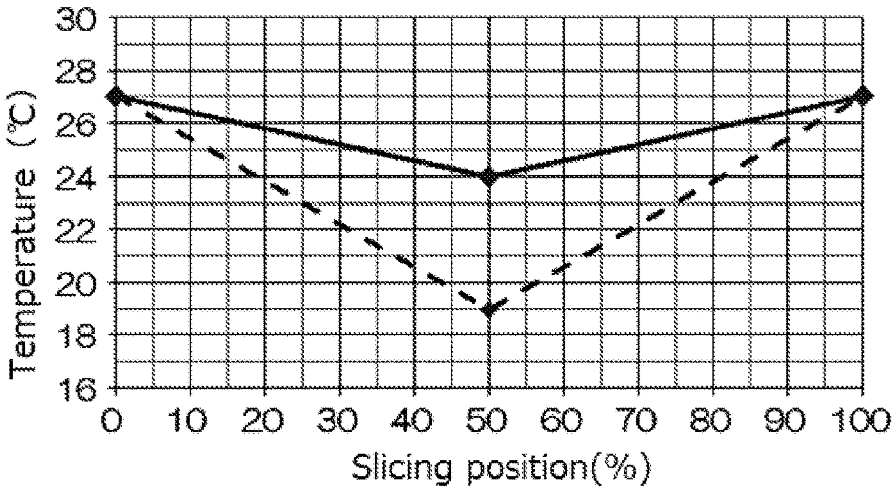

Using the same wire saw (apparatus A) as in Example 1, slicing was performed such that the directions of the warp forms in the workpiece feeding direction and in the wire travelling direction of wafers cut out from an ingot were all convex shaped. In Example 2, the temperature of the cooling water flowing inside the wire saw casing, the temperature of the cooling water flowing inside the wire guides, and the temperature of the slurry supplied when the ingot was sliced were controlled such that the temperature difference of each temperature between when the central portion was sliced and when the slicing was started and ended was small in comparison with Example 1 as shown in FIG. 10. Note that, regarding the notations in FIG. 10, the broken lines indicate the temperature conditions in Example 1, and the solid lines indicate the temperature conditions in Example 2.

Figure 11:
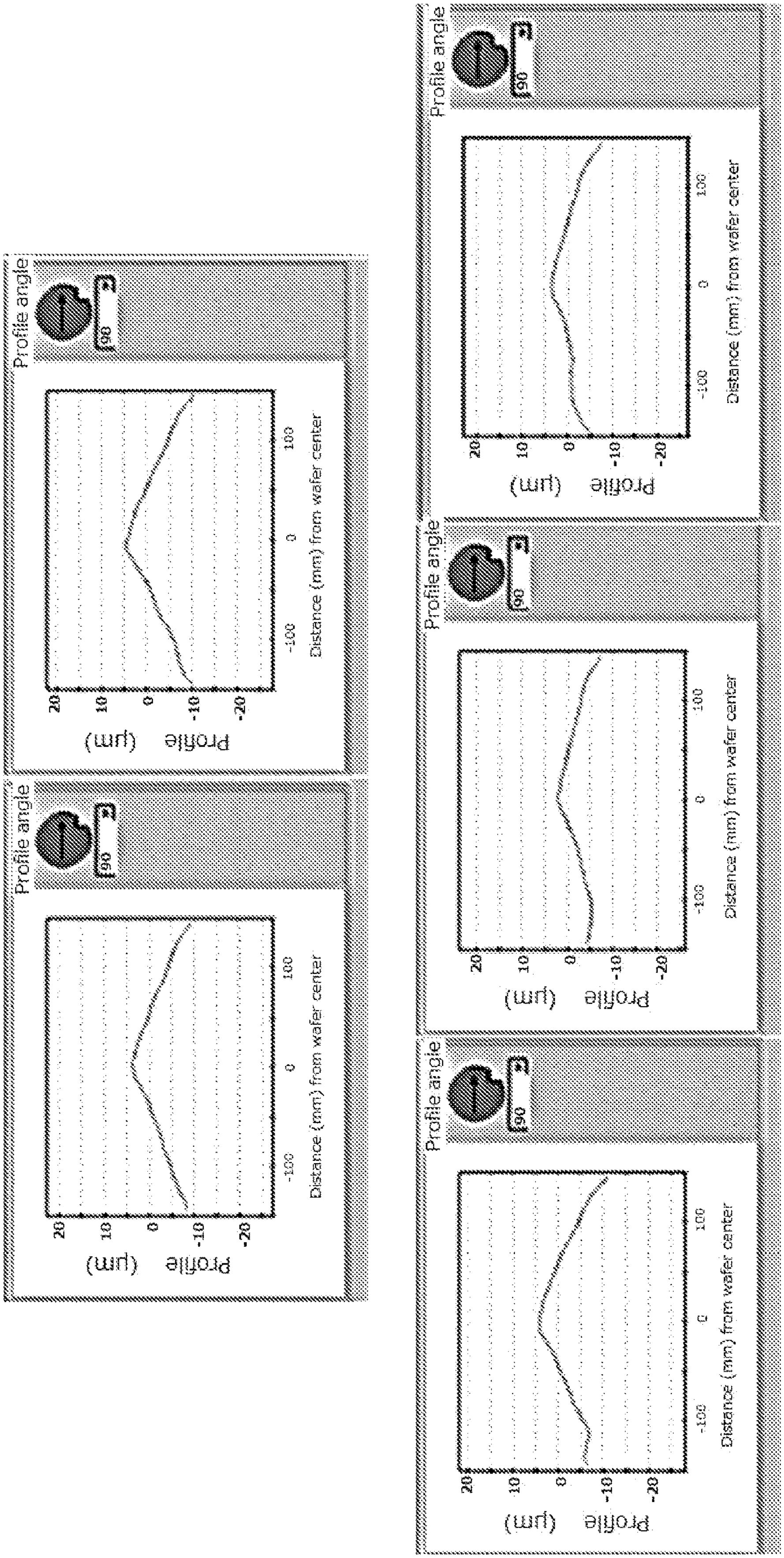
FIG. 11 shows graphs for illustrating warp forms in the workpiece feeding direction of sliced wafers in Example 2.

The forms of the sliced wafers were observed. The warp forms in the workpiece feeding direction were as shown in FIG. 11. Regardless of the ingot slicing positions, all the wafers had positive BO values, and the warp absolute values were smaller than those in Example 1 while all the convex shapes were retained. As described above, the obtained wafers were such that the directions of the warp forms in the workpiece feeding direction and in the wire travelling direction were identical regardless of the positions in the ingot.

Comparative Example 2

Figure 12A:
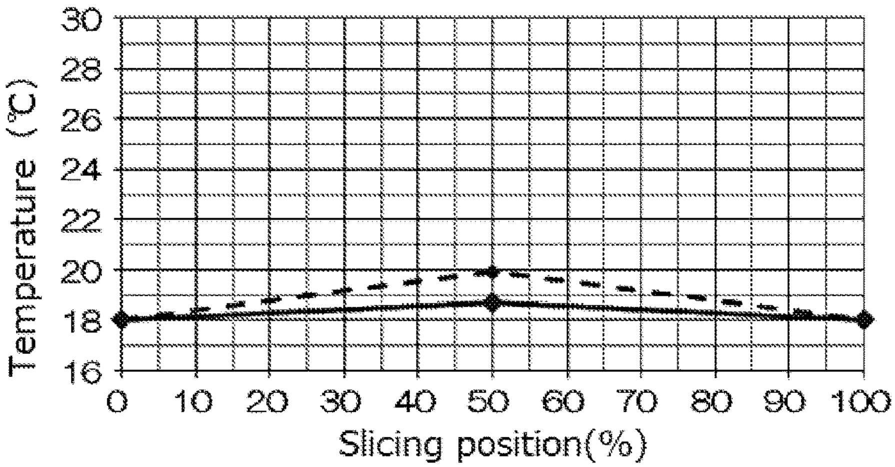
FIG. 12 shows graphs for illustrating temperature conditions in Comparative Example 2.
Figure 12B:
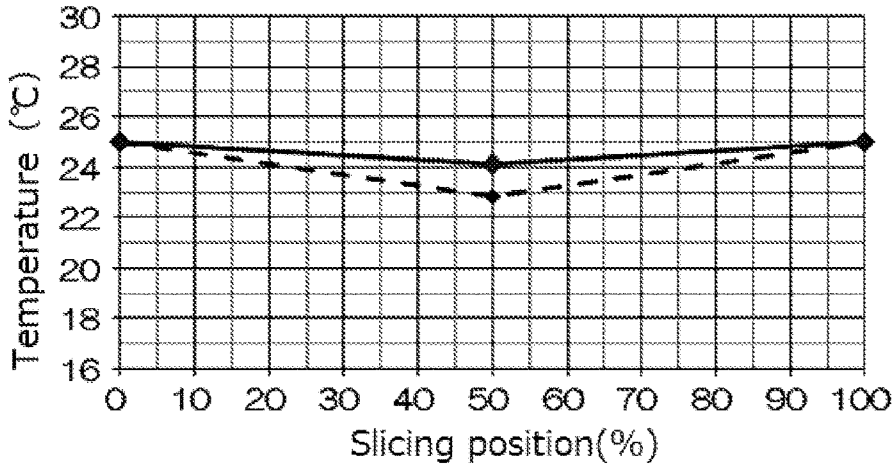
Figure 12C:
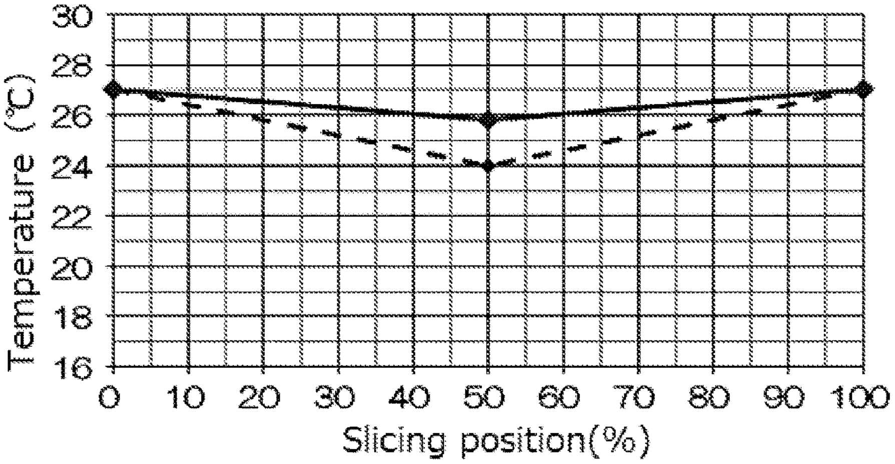

Although the same wire saw (apparatus A) as in Example 1 was used, slicing in Comparative Example 2 was performed under temperature conditions as shown in FIG. 12 in which, regarding each temperature of the temperature of the cooling water flowing inside the wire saw casing, the temperature of the cooling water flowing inside the wire guides, and the temperature of the slurry supplied when the ingot was sliced, the temperature differences between when the slicing was started and the central portion were further smaller than those in Example 2. Note that, regarding the notations in FIG. 12 for comparison, the broken lines indicate the temperature conditions in Example 2, and the solid lines indicate the temperature conditions in Comparative Example 2. The temperature conditions in Comparative Example 2 were designed so that the warp forms in the workpiece feeding direction would be convex shaped. Actually, however, not all the wafers were convex shaped in this case as described below.

Figure 13:
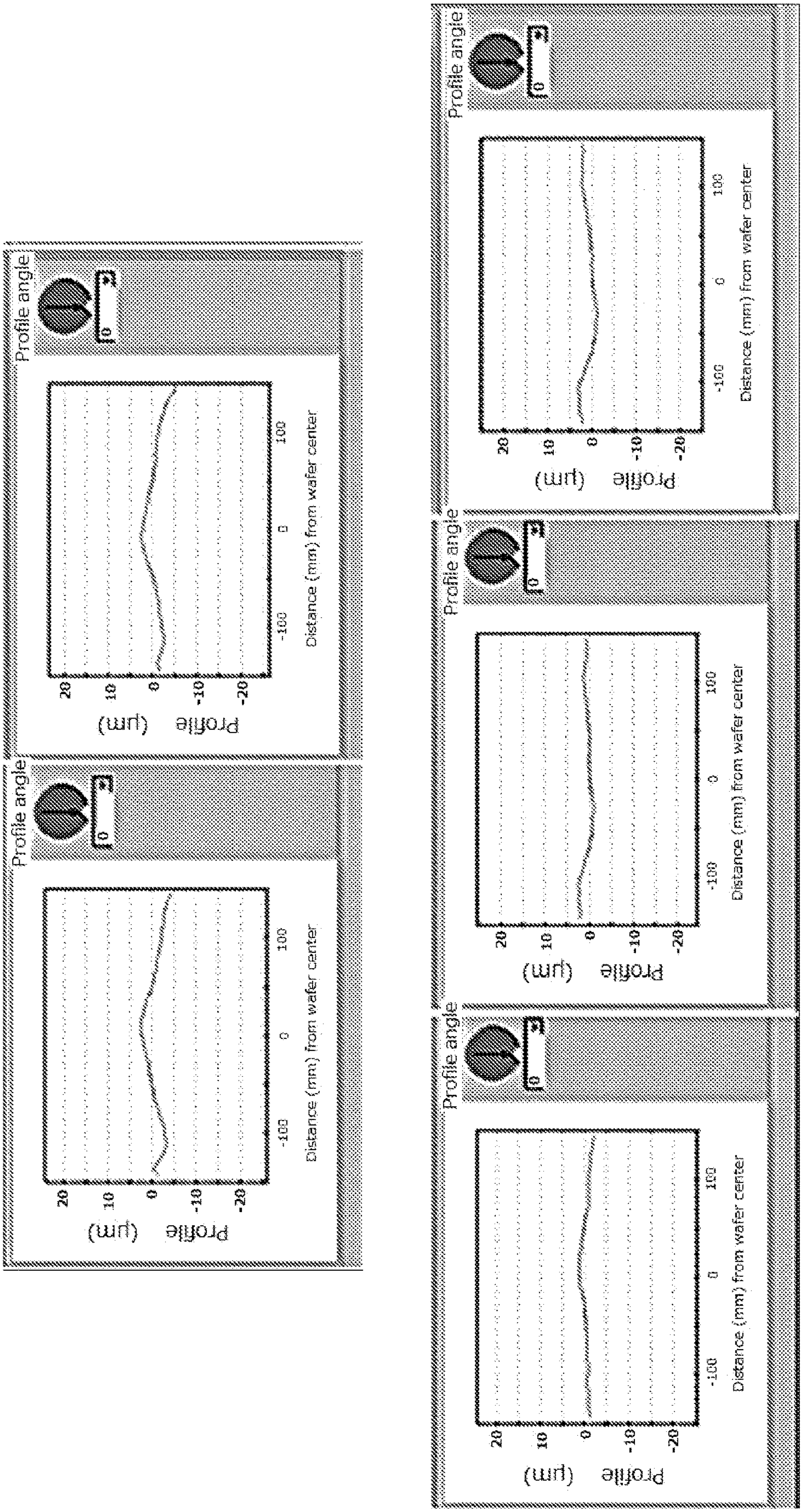
FIG. 13 shows graphs for illustrating warp forms in the workpiece feeding direction of sliced wafers in Comparative Example 2.

The forms of the sliced wafers were observed. The warp forms in the workpiece feeding direction were as shown in FIG. 13. The wafers from the P side to the center portion were convex shaped, whereas the wafers on the K side were substantially flat or slightly concave shaped. The result showed that not all the wafers in the ingot were directed in one direction. This is conceivably because the temperature difference of the temperature of the cooling water flowing inside the wire saw casing between when the slicing was started and ended and when the central portion was sliced was 4% or smaller than the temperature when the slicing was started and ended, and because the temperature difference of the temperature of the cooling water flowing inside the wire guides was also 4% or smaller than the temperature when the slicing was started and ended. This result revealed that the temperature difference of the each temperature between when the slicing is started and the central portion is preferably larger by 4% than the each temperature when the slicing is started.

From the foregoing, with the wire saw (apparatus A), the warp directions in the wire travelling direction of some wafers did not match with those in the workpiece feeding direction.

Comparative Example 3

Although the same wire saw (apparatus A) as in Example 1 was used, slicing in Comparative Example 3 was performed such that the warp forms in the workpiece feeding direction were concave shaped. Specifically, the ingot was sliced under such conditions that the warp directions in the workpiece feeding direction were opposite of those in the wire travelling direction. The temperature conditions in Comparative Example 3 were such that, regarding each temperature of the temperature of the cooling water flowing inside the wire saw casing, the temperature of the cooling water flowing inside the wire guides, and the temperature of the slurry supplied when the ingot was sliced, the temperature differences between when the slicing was started and the central portion were as shown in FIG. 4.

Figure 14:
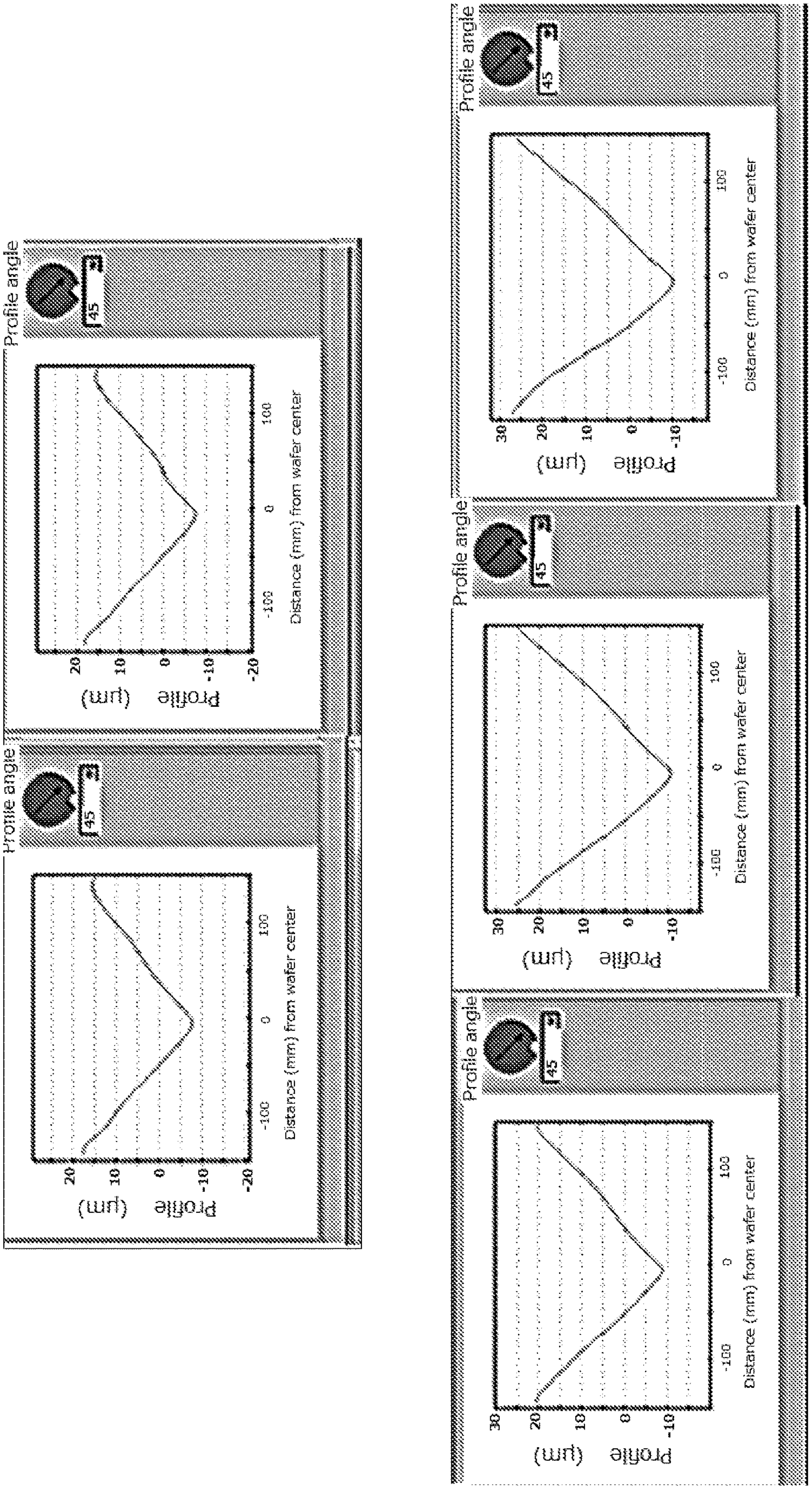
FIG. 14 shows graphs for illustrating warp forms in the workpiece feeding direction of sliced wafers in Comparative Example 3.

The forms of the sliced wafers were observed. The warp forms in the workpiece feeding direction were as shown in FIG. 14. Regardless of the ingot slicing positions, all the wafers had negative BOW values, and were all concave shaped. Meanwhile, with respect to the warp forms in the wire travelling direction, all the wafers were convex shaped regardless of the ingot slicing positions. As described above, the warp directions in the wire travelling direction of all the wafers were opposite of those in the workpiece feeding direction.

Example 3

Figure 15:
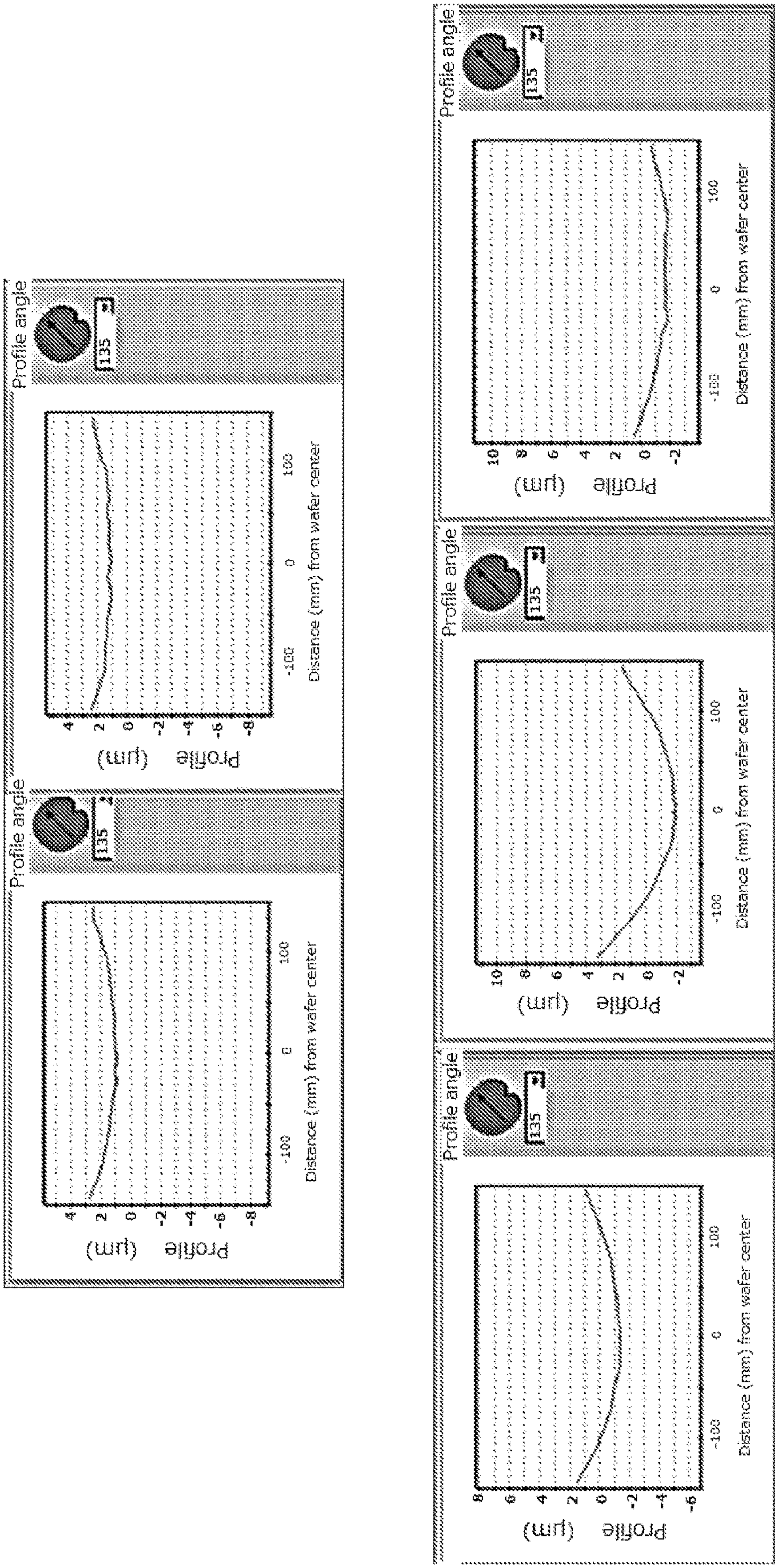
FIG. 15 shows graphs for illustrating warp forms in the wire travelling direction of wafers which have been checked in advance in a wire saw (apparatus B) before slicing in Example 3.

An ingot was sliced using a wire saw (apparatus B) which is different from that in Examples 1, 2 and Comparative Examples 1 to 3. First, the warp directions in the wire travelling direction of wafers obtained in previous ingot slicing were checked in advance before the slicing. With the wire saw (apparatus B) used in Example 3, the warp forms in the wire travelling direction were concave shaped at any position in the ingot as shown in FIG. 15.

Then, the slicing was performed such that the directions of the warp forms in the workpiece feeding direction and in the wire travelling direction of wafers cut out from a subsequent ingot were all concave shaped. Here, the slicing was performed under conditions in FIG. 16 in which, regarding the temperature of the cooling water flowing inside the wire saw casing, the temperature of the cooling water flowing inside the wire guides, and the temperature of the slurry supplied when the ingot was sliced, the temperature differences of these temperatures were smaller than those under the conditions in FIG. 4 of Comparative Example 3 designed for concave shapes. Note that, regarding the notations in FIG. 16 for comparison, the broken lines indicate the temperature conditions in Comparative Example 3, and the solid lines indicate the temperature conditions in Example 3.

Figure 17:
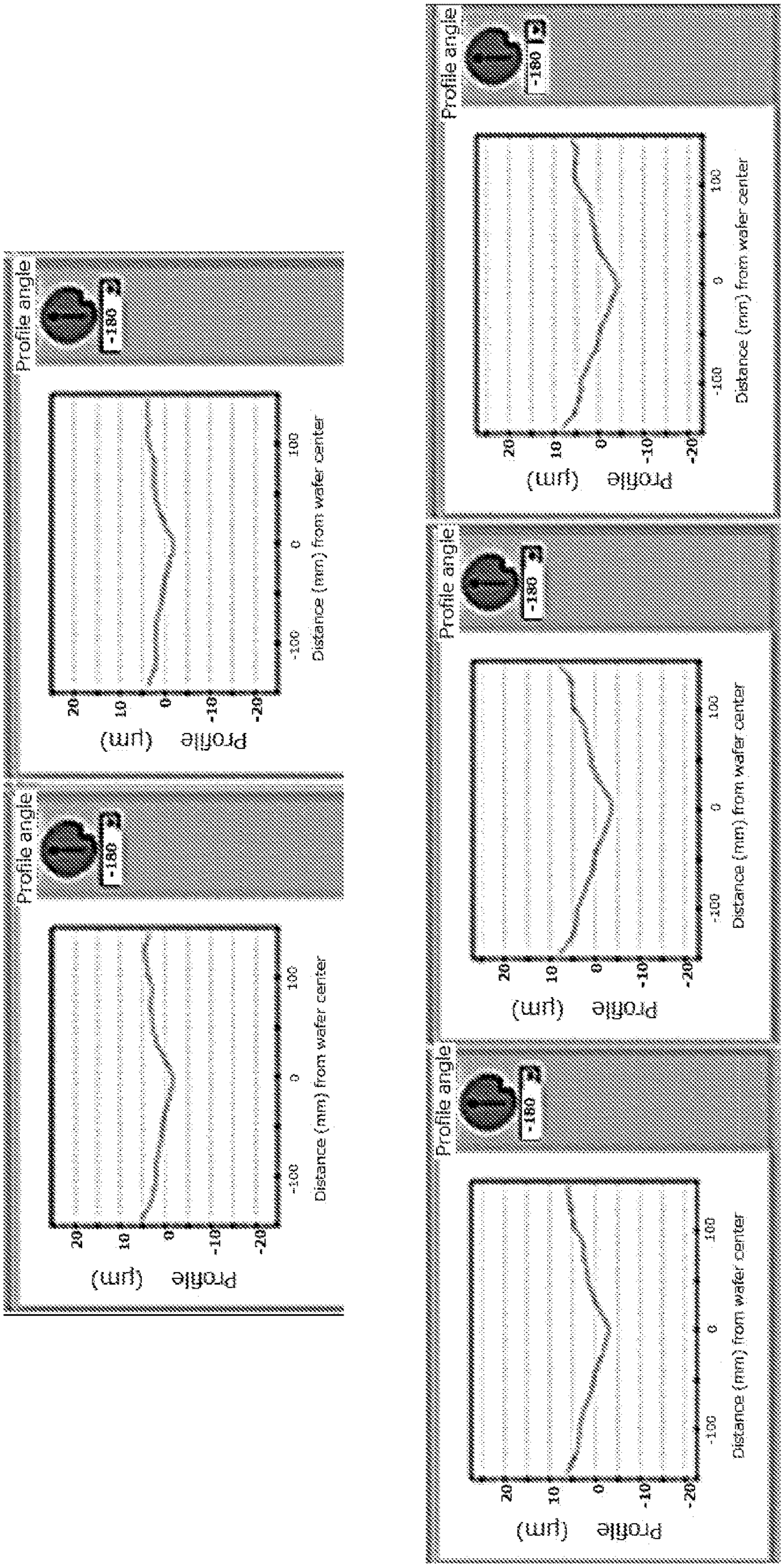
FIG. 17 shows graphs for illustrating warp forms in the workpiece feeding direction of sliced wafers in Example 3.
Figure 18:
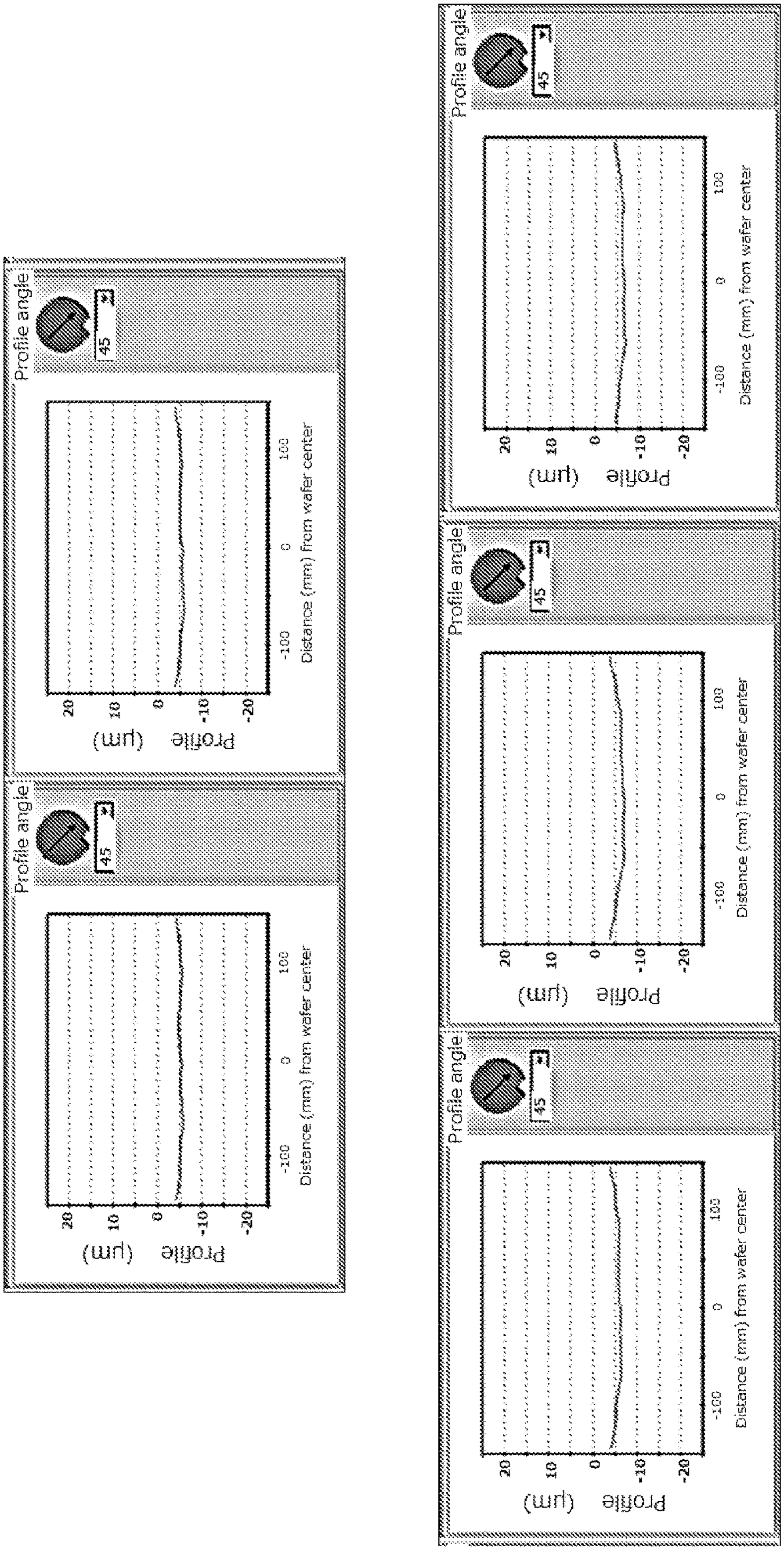
FIG. 18 shows graphs for illustrating warp forms in the wire travelling direction of the sliced wafers in Example 3.

The forms of the sliced wafers were observed. The warp forms in the workpiece feeding direction were as shown in FIG. 17. Regardless of the ingot slicing positions, all the wafers had negative BOW values, and were all concave shaped. Note that the warp absolute values were smaller than those in Comparative Example 3. Moreover, the warp forms in the wire travelling direction were as shown in FIG. 18. Like the warps in the wire travelling direction checked in advance, regardless of the ingot slicing positions, all the wafers had negative BOW values, and were all concave shaped. As described above, the obtained wafers were such that the warp directions in the workpiece feeding direction and in the wire travelling direction were identical regardless of the positions in the ingot.

Table 1 shows a summary of the slicing conditions and slicing results in Examples 1 to 3 and Comparative Examples 1 to 3.

TABLE 1

Figure 16A:
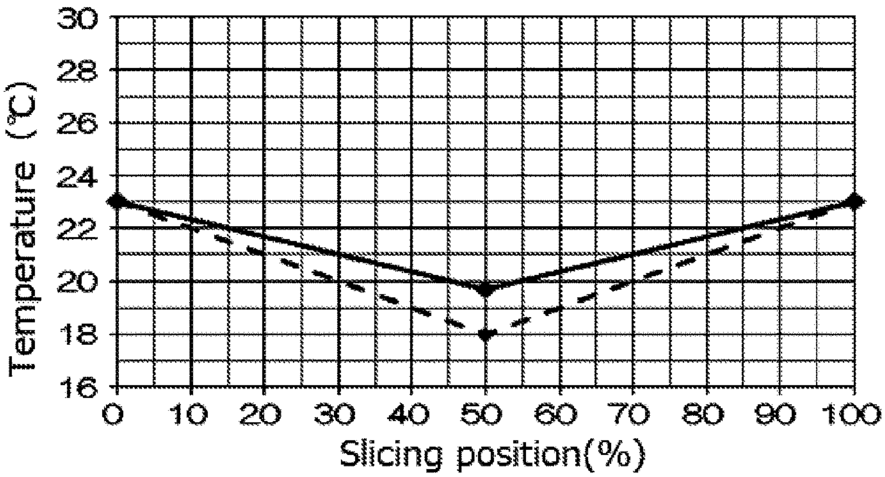
FIG. 16 shows graphs for illustrating temperature conditions in Example 3.
Figure 16B:
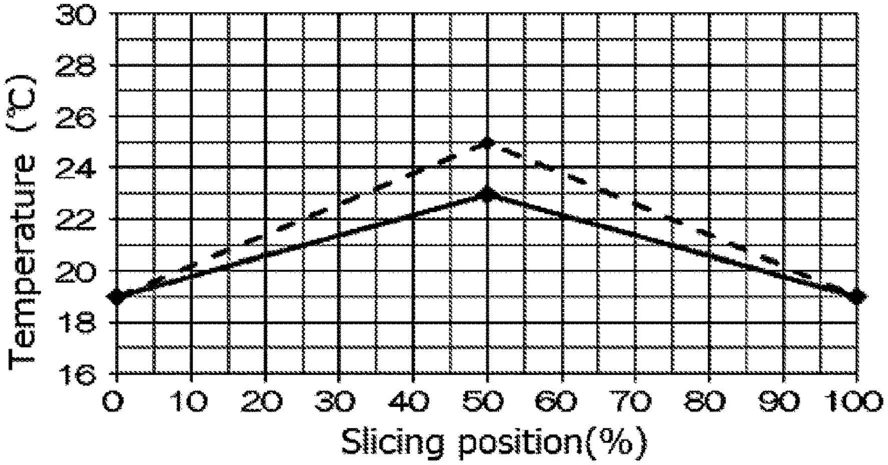
Figure 16C:
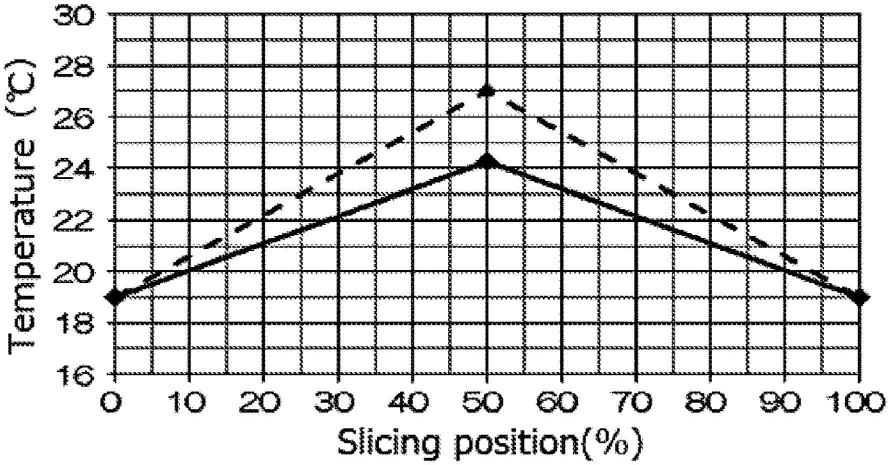

| | | | Targeted form | Warped wafer form | |
|---|---|---|---|---|---|
| | Wire saw apparatus | Slicing temperature condition | in workpiece feeding direction | wire travelling direction | workpiece feeding direction |
| Example 1 | apparatus A | FIG. 3 | convex shape | convex shape | all convex shapes |
| Example 2 | apparatus A | FIG. 10 | convex shape | convex shape | all convex shapes |
| Example 3 | apparatus B | FIG. 16 | concave shape | concave shape | all concave shapes |
| Comparative Example 1 | apparatus A | FIG. 5 | none | convex shape | Mixture of convex shapes and concave shapes |
| Comparative Example 2 | apparatus A | FIG. 12 | convex shape | convex shape | Mixture of convex shapes and a few concave shapes |
| Comparative Example 3 | apparatus A | FIG. 4 | concave shape | convex shape | all concave shapes |

(Preparation of Epitaxial Wafers)

The silicon wafers obtained above in Examples 1 to 3 and Comparative Examples 1 to 3 were polished and ground. Then, an epitaxial layer was grown on a main surface of each wafer. As a result, in Examples 1 to 3 in which the warp direction in the workpiece feeding direction was matched with the warp direction in the wire travelling direction, no wave was generated on all the epitaxial wafers. In contrast, in Comparative Examples 1 to 3, waves were generated on the epitaxial wafers.

It should be noted that the present invention is not limited to the above-described embodiments. The embodiments are just examples, and any examples that have substantially the same feature and demonstrate the same functions and effects as those in the technical concept disclosed in claims of the present invention are included in the technical scope of the present invention.

The invention claimed is:

1. A method for slicing an ingot with a wire saw, comprising:

forming a wire row by a wire spirally wound between a plurality of wire guides and configured to travel in an axial direction of the wire;

feeding an ingot held with a workpiece-feeding mechanism to the wire row for slicing; and obtaining a warp direction in a wire travelling direction of a wafer in a previous ingot slicing, and slicing the ingot into a plurality of wafers while supplying a slurry to a contact portion between the ingot and the wire, wherein the slicing occurs under a condition that a warp direction in a workpiece feeding direction of each of the plurality of wafers is identical to the obtained warp direction in the wire travelling direction.

2. The method for slicing an ingot according to claim 1, wherein the warp direction in the workpiece feeding direction is matched with the warp direction in the wire travelling direction by causing a temperature adjusting function of the wire saw to control one or more of a temperature of cooling water flowing inside a wire saw casing which holds the workpiece-feeding mechanism, a temperature of cooling water flowing inside each of the plurality of wire guides, and a temperature of the slurry, and the warp direction in the workpiece feeding direction and an absolute amount of warping in the workpiece feeding direction of each of the plurality of wafers cut out from the ingot are thus controlled.

3. The method for slicing an ingot according to claim 2, wherein the warp direction in the workpiece feeding direction and an absolute amount of warping in the workpiece feeding direction of the plurality of wafers cut out from the ingot are controlled, so that the warp direction in the workpiece feeding direction of each of the plurality of wafers cut out from the ingot is identical regardless of positions in the ingot.

4. The method for slicing an ingot according to claim 3, wherein the warp directions in the workpiece feeding direction of the plurality of wafers cut out from the ingot are made identical regardless of the positions in the ingot by controlling each controlled temperature including the temperature of the cooling water flowing inside the wire saw casing, the temperature of the cooling water flowing inside each of the plurality of wire guides, and the temperature of the slurry such that a temperature difference between (i) each controlled temperature when slicing the ingot is started or ended and (ii) each controlled temperature when a central portion of the ingot is sliced is larger than 4% of each controlled temperature when slicing the ingot is started or ended.

5. The method for slicing an ingot according to claim 4, wherein the temperature of the cooling water flowing inside the wire saw casing is controlled such that the temperature when the central portion of the ingot is sliced is higher than the temperature when slicing the ingot is started or ended by at least 4% of the temperature when slicing the ingot is started or ended, the temperature of the cooling water flowing inside the wire guides is controlled such that the temperature when the central portion of the ingot is sliced is lower than the temperature when slicing the ingot is started or ended by at least 4% of the temperature when slicing the ingot is started or ended, and the temperature of the slurry is controlled such that the temperature when the central portion of the ingot is sliced is lower than the temperature when slicing the ingot is started or ended by at least 4% of the temperature when slicing the ingot is started or ended, so that the warps in the workpiece feeding direction of the plurality of wafers cut out from the ingot are convex shaped.

6. The method for slicing an ingot according to claim 4, wherein the temperature of the cooling water flowing inside the wire saw casing is controlled such that the temperature when the central portion of the ingot is sliced is lower than the temperature when slicing the ingot is started or ended by at least 4% of the temperature when slicing the ingot is started or ended, the temperature of the cooling water flowing inside the wire guides is controlled such that the temperature when the central portion of the ingot is sliced is higher than the temperature when slicing the ingot is started or ended by at least 4% of the temperature when slicing the ingot is started or ended, and the temperature of the slurry is controlled such that the temperature when the central portion of the ingot is sliced is higher than the temperature when slicing the ingot is started or ended by at least 4% of the temperature when slicing the ingot is started or ended, so that the warps in the workpiece feeding direction of the plurality of wafers cut out from the ingot are concave shaped.

* * * * *